(12) United States Patent
Zhu et al.

(10) Patent No.: US 11,516,746 B2
(45) Date of Patent: Nov. 29, 2022

(54) DETERMINING A POWER OFFSET PARAMETER

(71) Applicant: LENOVO (BEIJING) LIMITED, Beijing (CN)

(72) Inventors: Chenxi Zhu, Beijing (CN); Bingchao Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/279,939

(22) PCT Filed: Nov. 2, 2018

(86) PCT No.: PCT/CN2018/113757
§ 371 (c)(1),
(2) Date: Mar. 25, 2021

(87) PCT Pub. No.: WO2020/087518
PCT Pub. Date: May 7, 2020

(65) Prior Publication Data
US 2021/0392590 A1  Dec. 16, 2021

(51) Int. Cl.
*H04W 52/16* (2009.01)
*H04W 52/36* (2009.01)

(52) U.S. Cl.
CPC ......... *H04W 52/16* (2013.01); *H04W 52/365* (2013.01)

(58) Field of Classification Search
CPC .. H04L 5/0051; H04W 52/16; H04W 52/365; H04W 52/42
USPC ............... 455/522, 69, 66.1, 67.11, 279.1
See application file for complete search history.

(56) References Cited

U.S. PATENT DOCUMENTS

| 2011/0243007 | A1  | 10/2011 | Xiao |
| 2011/0281612 | A1* | 11/2011 | Ishii ............... H04W 52/28 455/522 |
| 2013/0210500 | A1  | 8/2013  | Graham et al. |
| 2014/0153534 | A1* | 6/2014  | Kim ............... H04W 52/146 370/329 |
| 2014/0226551 | A1* | 8/2014  | Ouchi ............. H04W 52/244 370/311 |
| 2016/0270094 | A1  | 9/2016  | Dinan |

FOREIGN PATENT DOCUMENTS

WO  2010082756 A2  7/2010
WO  2018177410 A1  10/2018

OTHER PUBLICATIONS

International Searching Authority, "Notification of Transmittal of the International Search Report and the Written Opinion of the International Searching Authority, or the Declaration", PCT/CN2018/113757, dated Nov. 2, 2018, pp. 1-7.

* cited by examiner

*Primary Examiner* — John J Lee
(74) *Attorney, Agent, or Firm* — Kunzler Bean & Adamson

(57) ABSTRACT

Apparatuses, methods, and systems are disclosed for determining a power offset parameter. One method (500) includes determining (502) a power vector using at least one sounding reference signal resource. The power vector includes a power corresponding to each port of a device. The method (500) includes determining (504) a power offset parameter based on the power vector, and transmitting (506) the power offset parameter.

20 Claims, 6 Drawing Sheets

DETERMINING A POWER OFFSET PARAMETER

FIELD

The subject matter disclosed herein relates generally to wireless communications and more particularly relates to determining a power offset parameter.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth Part ("BWP"), Codebook ("CB"), Component Carrier ("CC"), Coordinated Multipoint ("CoMP"), Categories of Requirements ("CoR"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("JAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Medium Access Control ("MAC"), Modulation Coding Scheme ("MCS"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Power Amplifier ("PA"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Power Headroom Report ("PHR"), Public Land Mobile Network ("PLMN"), Precoding Matrix Indicator ("PMI"), ProSe Per Packet Priority ("PPPP"), ProSe Per Packet Reliability ("PPPR"), Packet Switched ("PS"), Physical Sidelink Shared Channel ("PSSCH"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Resource Pool ("RP"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Sub Carrier Spacing ("SCS"), Service Data Unit ("SDU"), Subscriber Identity Module ("SIM"), Signal-to-Interference and Noise Ratio ("SINR"), Sidelink ("SL"), Sequence Number ("SN"), Scheduling Request ("SR"), SRS Set Indicator ("SRI"), Sounding Reference Signal ("SRS"), Synchronization Signal ("SS"), SS/PBCH Block ("SSB"), Time Division Duplex ("TDD"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a power headroom report may be used. In such networks, the power headroom report may not provide sufficient information for determining power headroom for multiple ports.

BRIEF SUMMARY

Methods for determining a power offset parameter are disclosed. Apparatuses and systems also perform the functions of the apparatus. In one embodiment, the method includes determining a power vector using at least one sounding reference signal resource. In such an embodiment, the power vector includes a power corresponding to each port of a device. In certain embodiments, the method includes determining a power offset parameter based on the power vector. In some embodiments, the method includes transmitting the power offset parameter.

An apparatus for determining a power offset parameter, in one embodiment, includes a processor that: determines a power vector using at least one sounding reference signal resource, wherein the power vector includes a power corresponding to each port of a device; and determines a power offset parameter based on the power vector. In various embodiments, the apparatus includes a transmitter that transmits the power offset parameter.

A method for receiving a power offset parameter includes receiving a power offset parameter. In such an embodiment, the power offset parameter is determined based on a power vector, the power vector is determined using at least one sounding reference signal resource, and the power vector includes a power corresponding to each port of a device.

An apparatus for receiving a power offset parameter, in one embodiment, includes a receiver that receives a power offset parameter. In such an embodiment, the power offset parameter is determined based on a power vector, the power vector is determined using at least one sounding reference signal resource, and the power vector includes a power corresponding to each port of a device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
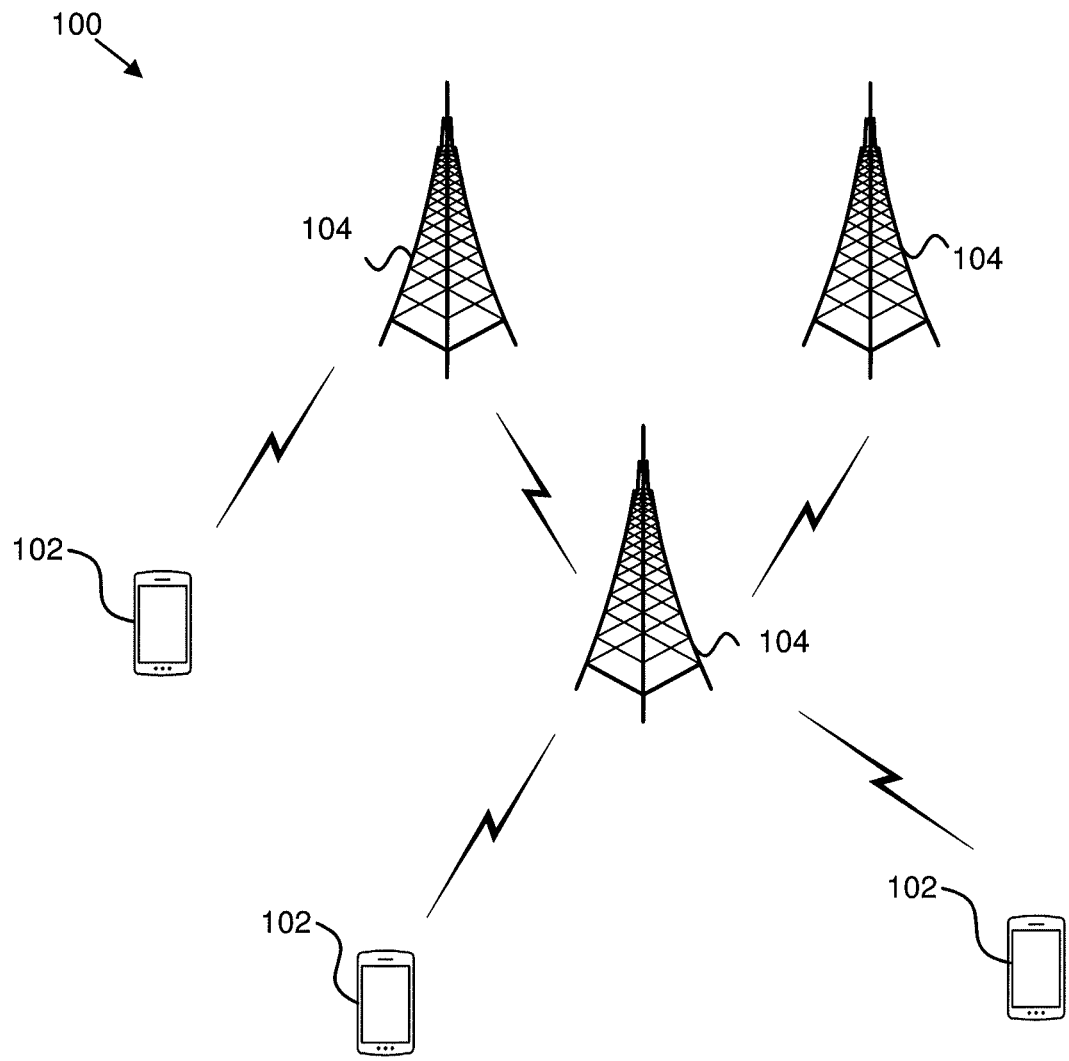
FIG. 1 is a schematic block diagram illustrating one embodiment of a wireless communication system for determining a power offset parameter.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a power offset parameter. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine a power vector using at least one sounding reference signal resource. In such embodiments, the power vector includes a power corresponding to each port of a device. In certain embodiments, the remote unit 102 may determine a power offset parameter based on the power vector. In some embodiments, the remote unit 102 may transmit the power offset parameter. Accordingly, a remote unit 102 may be used for determining a power offset parameter.

In some embodiments, a network unit 104 may receive a power offset parameter. In such embodiments, the power offset parameter is determined based on a power vector, the power vector is determined using at least one sounding reference signal resource, and the power vector includes a power corresponding to each port of a device. Accordingly, a network unit 104 may be used for receiving a power offset parameter.

Figure 2:
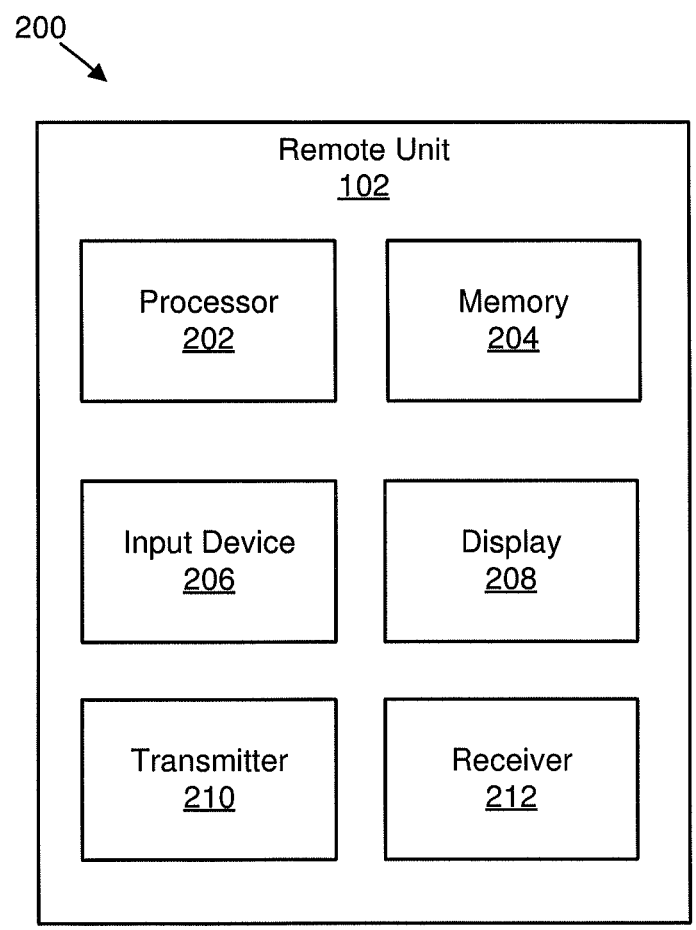
FIG. 2 is a schematic block diagram illustrating one embodiment of an apparatus that may be used for determining a power offset parameter.

FIG. 2 depicts one embodiment of an apparatus 200 that may be used for determining a power offset parameter. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202: determines a power vector using at least one sounding reference signal resource, wherein the power vector includes a power corresponding to each port of a device; and determines a power offset parameter based on the power vector. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the transmitter 210 transmits a power offset parameter.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
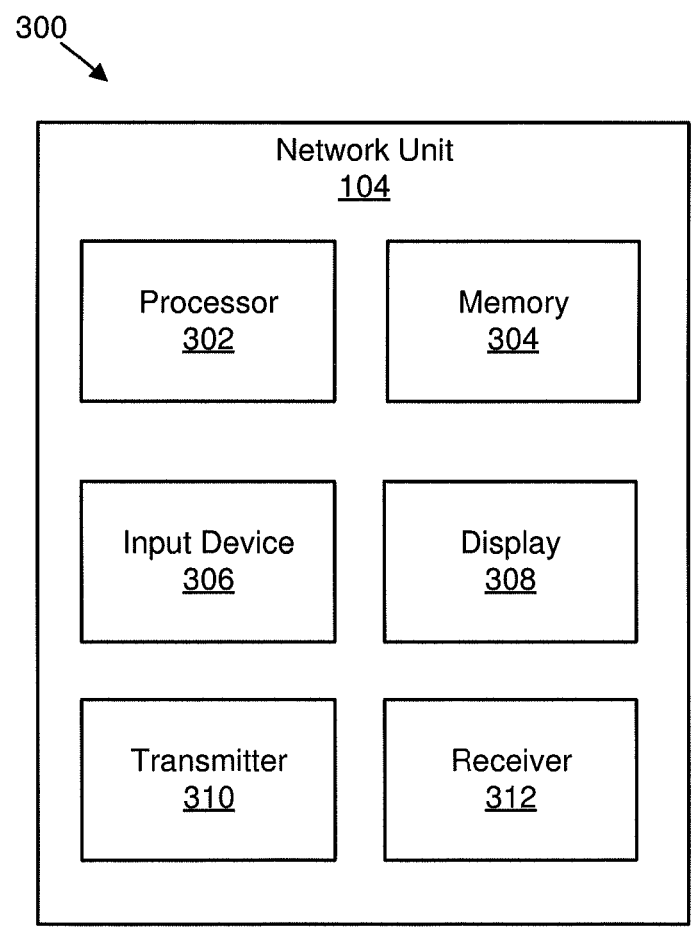
FIG. 3 is a schematic block diagram illustrating one embodiment of an apparatus that may be used for receiving a power offset parameter.

FIG. 3 depicts one embodiment of an apparatus 300 that may be used for receiving a power offset parameter. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives a power offset parameter. In such embodiments, the power offset parameter is determined based on a power vector, the power vector is determined using at least one sounding reference signal resource, and the power vector includes a power corresponding to each port of a device.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, for non-CB based PUSCH, a UE (e.g., remote unit 102) may be able to determine a precoder (e.g., a precoding matrix) used for the SRS ports. In such embodiments, the precoder determined by the UE may not be a predefined precoder and a total baseband transmission power may not be unit value. The transmission power at antenna ports may not be uniform either. The precoder may operate similar to a precoder illustrated in FIG. 4.

Figure 4:
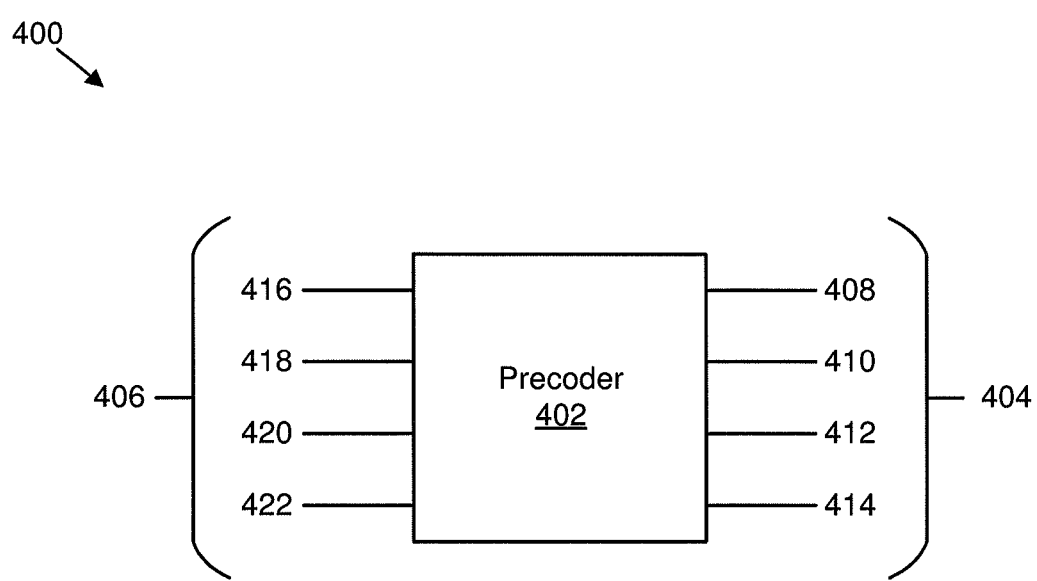
FIG. 4 is a schematic block diagram illustrating one embodiment of a precoding system.

FIG. 4 is a schematic block diagram illustrating one embodiment of a precoding system 400. The precoding system 400 includes a precoder 402 ("W") that receives a set of SRS port inputs 404, applies a precoding matrix from the precoder 402, and outputs a set of transmission powers 406 for antenna ports. The set of SRS port inputs 404 includes a first SRS port 408 ("$s_0$"), a second SRS port 410 ("$s_1$"), a third SRS port 412 ("$s_2$"), and an nth SRS port 414 ("$s_{N_s}$"). As may be appreciated, the set of SRS port inputs 404 may include any suitable number of SRS port inputs. The set of transmission powers 406 includes a first transmission power 416 corresponding to a first antenna port ("$p_0$"), a second transmission power 418 corresponding to a second antenna port ("$p_1$"), a third transmission power 420 corresponding to a third antenna port ("$p_2$"), and an nth transmission power 422 corresponding to an nth antenna port ("$p_{N_a}$"). As may be appreciated, the set of transmission powers 406 may include any suitable number of transmission powers corresponding to a respective number of antenna ports.

In certain embodiments, a baseband signal may be determined as follows:

$$P = WS$$

$$\begin{bmatrix} p_0 \\ p_1 \\ \vdots \\ p_{N_a} \end{bmatrix} = \begin{bmatrix} w_{00} & \cdots & w_{0N_s} \\ \vdots & \ddots & \vdots \\ w_{N_a 0} & \cdots & w_{N_a N_s} \end{bmatrix} \begin{bmatrix} s_0 \\ s_1 \\ s_2 \\ s_{N_s} \end{bmatrix}$$

for $N_a$ antenna ports and $N_s$ single port SRS resources. In various embodiments, baseband transmission powers of antenna ports may be functions of a set of SRS ports (e.g., SRI) used in PUSCH, as follows:

$$TP(SRI) = \begin{bmatrix} Tp_0(SRI) \\ Tp_1(SRI) \\ \vdots \\ Tp_{N_a}(SRI) \end{bmatrix},$$

where the transmission power of antenna port i is as follows:

$$Tp_i(SRI) = \sum_{j=0}^{N_s} |w_{ij}|^2 |s_j|^2, \text{ and}$$

$$|s_j|^2 = \begin{cases} 1, & \text{if } SRS \text{ port } j \text{ is in } SRI \text{ for } PUSCH \text{ transmission} \\ 0, & \text{otherwise} \end{cases}$$

In certain embodiments, a transmission power vector of PUSCH using SRS port j alone may be defined as follows:

$$TP(S_j) = \begin{bmatrix} |w_{0j}|^2 \\ |w_{1j}|^2 \\ \vdots \\ |w_{N_a j}|^2 \end{bmatrix},$$

and the transmission power vector of PUSCH using multiple SRS ports SRI={$S_j, \ldots, S_l$} may be as follows:

$$TP(SRI) = \sum_{S_k \in SRI} TP(S_k)$$

With non-CB based transmission, a UE may be free to choose an SRS precoding matrix W. For a single SRS port j, it may be possible that a transmission power of an antenna port is different ($|w_{ij}|^2 \neq |w_{kj}|^2$ for $l \neq k$). In some embodiments, transmission power may depend on selected SRS ports. In various embodiments, it may not be possible for a gNB (e.g., network unit 104) to determine how close a transmission power $Tp_i$ of an antenna port i is to a maximal power limit of its power amplifier ("PA"), even with a PUSCH PHR from the UE. Because Type 3 PHR (e.g., SRS PHR) is similar to PUSCH PHR, a gNB may not be able to determine how close a transmission power $Tp_i$ of an antenna port i is to a maximal power limit of its PA from SRS PHR either. One exception may be if W is an identity matrix (e.g., no SRS beamforming is performed).

In some embodiments, in order to provide a gNB information regarding a real power headroom of each antenna port if different SRS resources or resource combinations are used for non-codebook based PUSCH transmission, a UE may send an offset to a power headroom to the gNB in the form of a baseband transmission power per antenna port. Because the TX power of different antenna ports is different, and they also vary for different SRIs, TX power offset information may be used for the antenna ports (e.g., instead of total TX power).

A first embodiment may include signaling a TX power offset per port per SRS resource for PUSCH power headroom calculation.

In such an embodiment, for each SRS resource i, $S_i$ that is used for non-CB based UL transmission, a UE signals baseband TX power for all its antenna ports as follows:

$$TP(S_j) = \begin{bmatrix} Tp_0(S_j) \\ Tp_1(S_j) \\ \vdots \\ Tp_{N_a}(S_j) \end{bmatrix} = \begin{bmatrix} |w_{0j}|^2 \\ |w_{1j}|^2 \\ \vdots \\ |w_{N_p j}|^2 \end{bmatrix}$$

With $TP(S_j)$ with all $S_j$ of SRS resources defined for non-CB based UL transmission (e.g., in an SRS resource set configured with higher layer parameter usage in SRS-ResourceSet set to 'nonCodebook'), a gNB may compute the baseband TX power for all the antenna ports for any SRI (e.g., different SRS resource combinations) as follows:

$$TP(SRI) = \sum_{S_k \in SRI} TP(S_k)$$

The baseband TX power at antenna i with SRS $Tp_i(S_j)$ may be quantized in dB with a few bits, such as 2 bits, and sent from a UE to a gNB in RRC signaling or via MAC messages. $TP(S_j)$ can be concatenated in ascending or descending order with respect to SRS resource indices.

By combining the TX power offset per port per SRS resource with a PUSCH PHR from a UE, a gNB may calculate a true power headroom for each antenna port for non-codebook based PUSCH transmission.

A second embodiment may include signaling a max TX power offset per SRI combination for PUSCH power headroom calculation.

In such an embodiment, for each SRI (e.g., SRS combination), the following may be computed:

$$TP(SRI) = \begin{bmatrix} Tp_0(SRI) \\ Tp_1(SRI) \\ \vdots \\ Tp_{N_a}(SRI) \end{bmatrix} = \sum_{S_k \in SRI} TP(S_k)$$

Moreover, a UE may compute and send to a gNB a maximum baseband TX power of all antenna ports for an SRI as follows:

$$TP^{max}(SRI) = \max_{i=1...N_a} Tp_i(SRI)$$

Because the TX power of the antenna ports are upper bounded by the maximum PA power, it is sufficient for the gNB to know the maximum power of all the antenna ports. $TP^{max}(SRI)$ may be quantized with a few bits, such as 2 bits, and sent to the gNB via MAC messages or RRC signaling. $TP^{max}(SRI)$ may be concatenated in a same order as the SRI bit field of DCI format 0_1. Based on $TP^{max}$ (SRI), and the PUSCH PHR, the gNB may calculate a true smallest power headroom at all the antenna ports.

A third embodiment may include signaling a max TX power offset per SRS for SRS power headroom calculation.

Such an embodiment may provide a maximum baseband transmission power of all antenna ports for a SRS resource, in order for a gNB to calculate the real power headroom for a precoded SRS. The third embodiment is similar to the second embodiment, except that instead of all the possible SRIs, $TP^{max}(S_j)$ for a (single or multiple port) SRS resource are sent to the gNB.

This is done as follows:

$$TP(S_j) = \begin{bmatrix} Tp_0(S_j) \\ Tp_1(S_j) \\ \vdots \\ Tp_{N_a}(S_j) \end{bmatrix} = \sum_{S_{jk}} TP(S_{jk})$$

$S_{jk}$ is a precoder (e.g., column) vector for a kth antenna port of SRS resource j, or equivalently the kth column of the precoding matrix $W_j$ for SRS resource j. The summation is over all the SRS ports of SRS resource j. Similar to the second embodiment, only the largest element of the baseband transmission power vector $TP(S_j)$ as follows:

$$TP^{max}(SRI) = \max_{i=1...N_a} Tp_i(SRI)$$

is sent to the gNB in MAC messages or via RRC signaling. $TP^{max}(S_j)$ may be concatenated in ascending or descending order with respect to an SRS resource index.

Based on $TP^{max}(S_j)$, together with SRS PHR, the gNB may have accurate information for the power headroom for the antenna ports for an SRS resource j.

For all three embodiments, because the baseband transmission power depends on SRS precoding matrix W, a UE may send an update to the gNB when W changes.

Figure 5:
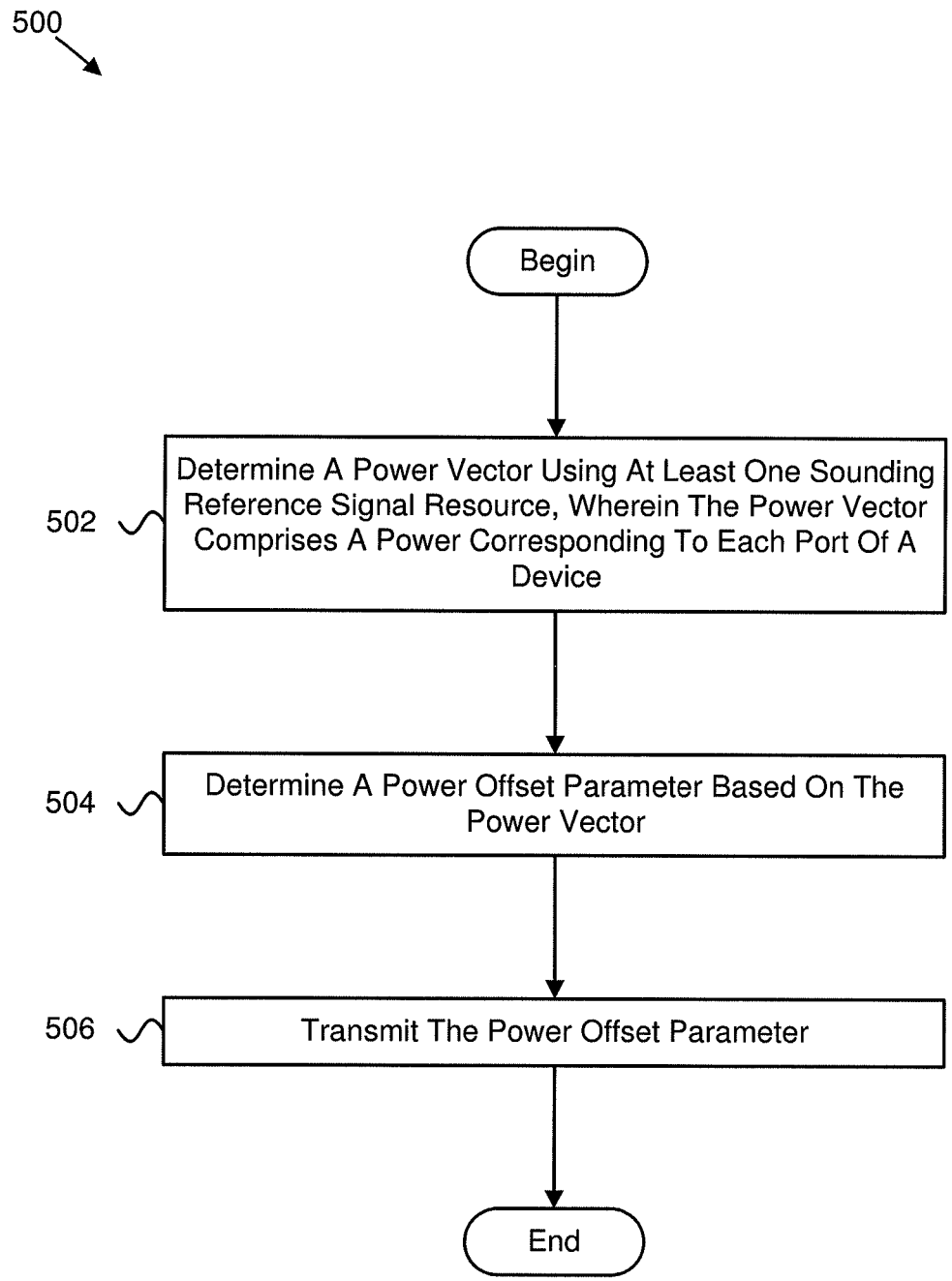
FIG. 5 is a schematic flow chart diagram illustrating one embodiment of a method for determining a power offset parameter.

FIG. 5 is a schematic flow chart diagram illustrating one embodiment of a method 500 for determining a power offset parameter. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502 a power vector using at least one sounding reference signal resource. In such an embodiment, the power vector includes a power corresponding to each port of a device. In certain embodiments, the method 500 includes determining 504 a power offset parameter based on the power vector. In some embodiments, the method 500 includes transmitting 506 the power offset parameter.

In some embodiments, the power offset parameter comprises the power vector. In certain embodiments: determining the power vector using the at least one sounding reference signal resource comprises determining a plurality of power vectors, wherein each power vector of the plurality of power vectors is determined using each sounding reference signal resource of a plurality of sounding reference signal resources; determining the power offset parameter based on the power vector comprises determining a plurality of power offset parameters, wherein each power offset parameter of the plurality of power offset parameters is determined based on a respective power vector of the plurality of power vectors; and transmitting the power offset parameter comprises transmitting the plurality of power offset parameters.

In various embodiments, the plurality of power offset parameters is concatenated based on an order corresponding to the plurality of sounding reference signal resources. In one embodiment, the order comprises an ascending order. In some embodiments, the order comprises a descending order.

In certain embodiments, the power offset parameter comprises a maximum transmission power of the power vector. In various embodiments, the at least one sounding reference signal resource comprises a plurality of sounding reference signal resources. In one embodiment, the plurality of sounding reference signal resources is part of a sounding reference signal resource combination.

In some embodiments: determining the power vector using the at least one sounding reference signal resource comprises determining a plurality of power vectors, wherein each power vector of the plurality of power vectors is determined using a sounding reference signal resource combination of a plurality of sounding reference signal resource combinations; determining the power offset parameter based on the power vector comprises determining a plurality of power offset parameters, wherein each power offset parameter of the plurality of power offset parameters comprises a maximum transmission power of a corresponding power vector of the plurality of power vectors; and transmitting the power offset parameter comprises transmitting the plurality of power offset parameters. In certain embodiments, the plurality of power offset parameters is concatenated based on an order corresponding to a sounding reference signal resource combination bit field.

In various embodiments: determining the power vector using the at least one sounding reference signal resource comprises determining a plurality of power vectors, wherein each power vector of the plurality of power vectors is determined using a sounding reference signal resource of at least one sounding reference signal port; determining the power offset parameter based on the power vector comprises determining a plurality of power offset parameters, wherein each power offset parameter of the plurality of power offset parameters comprises a maximum transmission power of a corresponding power vector of the plurality of power vectors; and transmitting the power offset parameter comprises transmitting the plurality of power offset parameters.

In one embodiment, the method 500 comprises receiving information indicating a change in transmission power. In some embodiments, the method 500 comprises, in response to receiving information indicating a change in transmission power: determining an updated power vector using the at least one sounding reference signal resource; determining an updated power offset parameter based on the updated power vector; and transmitting the updated power offset parameter. In certain embodiments, the method 500 comprises encoding the power offset parameter prior to transmitting the power offset parameter.

In various embodiments, the power offset parameter is transmitted in a medium access control message. In one embodiment, the power offset parameter is transmitted in a radio resource control message. In some embodiments, the method 500 comprises receiving information indicating whether the power offset parameter comprises the power vector or a maximum transmission power of the power vector.

Figure 6:
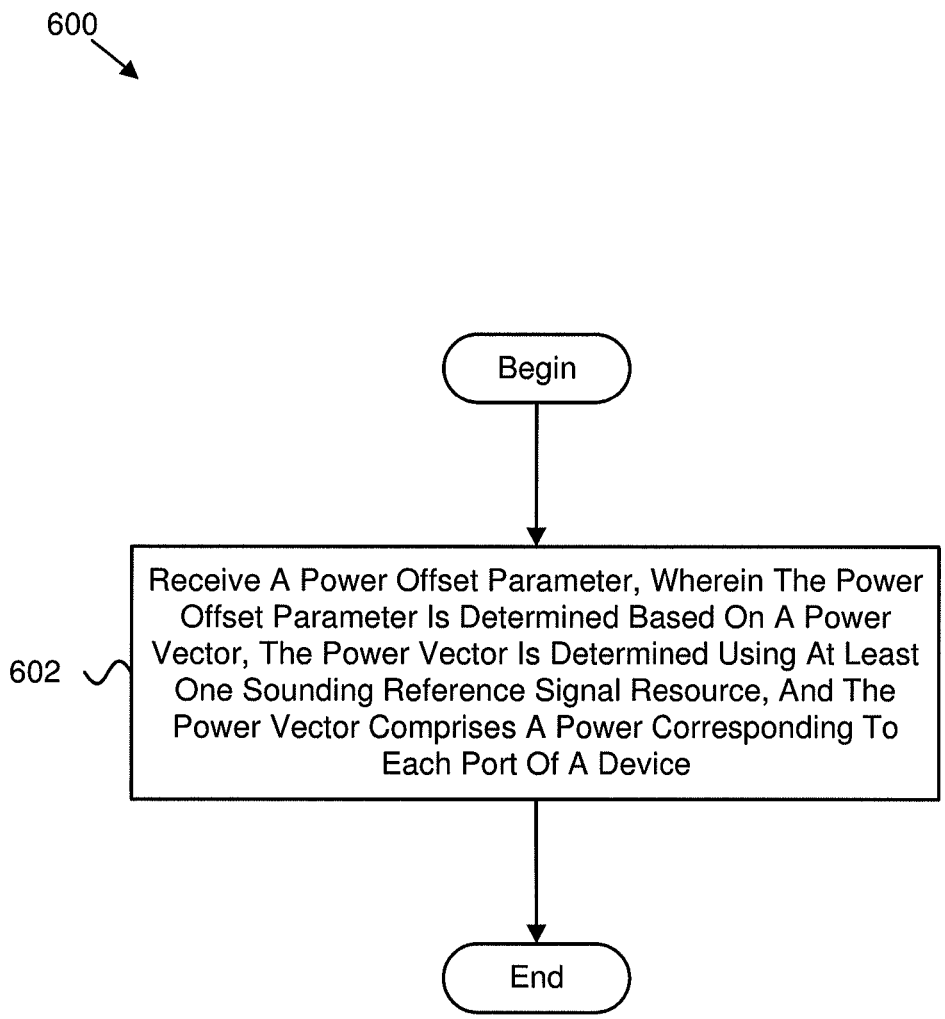
FIG. 6 is a schematic flow chart diagram illustrating one embodiment of a method for receiving a power offset parameter.

FIG. 6 is a schematic flow chart diagram illustrating one embodiment of a method 600 for receiving a power offset parameter. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a power offset parameter. In such embodiments, the power offset parameter is determined based on a power vector, the power vector is determined using at least one sounding reference signal resource, and the power vector includes a power corresponding to each port of a device.

In some embodiments, the power offset parameter corresponds to each sounding reference signal resource of the at least one sounding reference signal resource. In certain embodiments, the power offset parameter corresponds to each sounding reference signal resource combination of a plurality of sounding reference signal resource combinations. In various embodiments, the method 600 comprises determining a power headroom for each antenna port of the device using the power offset parameter and a power headroom report corresponding to the device.

In one embodiment, the method 600 comprises receiving an updated power offset parameter. In some embodiments, the power offset parameter comprises the power vector. In certain embodiments, the power offset parameter comprises a maximum transmission power of the power vector.

In various embodiments, the at least one sounding reference signal resource comprises a plurality of sounding reference signal resources. In one embodiment, the plurality of sounding reference signal resources is part of a sounding reference signal resource combination.

In some embodiments, the method 600 comprises transmitting information indicating a change in transmission power.

In certain embodiments, the power offset parameter is received in a medium access control message. In various embodiments, the power offset parameter is received in a radio resource control message. In one embodiment, the method 600 comprises transmitting information indicating whether the power offset parameter comprises the power vector or a maximum transmission power of the power vector.

In one embodiment, a method comprises: determining a power vector using at least one sounding reference signal resource, wherein the power vector comprises a power corresponding to each port of a device; determining a power offset parameter based on the power vector; and transmitting the power offset parameter.

In some embodiments, the power offset parameter comprises the power vector.

In certain embodiments: determining the power vector using the at least one sounding reference signal resource comprises determining a plurality of power vectors, wherein each power vector of the plurality of power vectors is determined using each sounding reference signal resource of a plurality of sounding reference signal resources; determining the power offset parameter based on the power vector comprises determining a plurality of power offset parameters, wherein each power offset parameter of the plurality of power offset parameters is determined based on a respective power vector of the plurality of power vectors; and transmitting the power offset parameter comprises transmitting the plurality of power offset parameters.

In various embodiments, the plurality of power offset parameters is concatenated based on an order corresponding to the plurality of sounding reference signal resources.

In one embodiment, the order comprises an ascending order.

In some embodiments, the order comprises a descending order.

In certain embodiments, the power offset parameter comprises a maximum transmission power of the power vector.

In various embodiments, the at least one sounding reference signal resource comprises a plurality of sounding reference signal resources.

In one embodiment, the plurality of sounding reference signal resources is part of a sounding reference signal resource combination.

In some embodiments: determining the power vector using the at least one sounding reference signal resource comprises determining a plurality of power vectors, wherein each power vector of the plurality of power vectors is determined using a sounding reference signal resource combination of a plurality of sounding reference signal resource combinations; determining the power offset parameter based on the power vector comprises determining a plurality of power offset parameters, wherein each power offset parameter of the plurality of power offset parameters comprises a maximum transmission power of a corresponding power vector of the plurality of power vectors; and transmitting the power offset parameter comprises transmitting the plurality of power offset parameters.

In certain embodiments, the plurality of power offset parameters is concatenated based on an order corresponding to a sounding reference signal resource combination bit field.

In various embodiments: determining the power vector using the at least one sounding reference signal resource comprises determining a plurality of power vectors, wherein each power vector of the plurality of power vectors is determined using a sounding reference signal resource of at least one sounding reference signal port; determining the power offset parameter based on the power vector comprises determining a plurality of power offset parameters, wherein each power offset parameter of the plurality of power offset parameters comprises a maximum transmission power of a corresponding power vector of the plurality of power vectors; and transmitting the power offset parameter comprises transmitting the plurality of power offset parameters.

In one embodiment, the method comprises receiving information indicating a change in transmission power.

In some embodiments, the method comprises, in response to receiving information indicating a change in transmission power: determining an updated power vector using the at least one sounding reference signal resource; determining an updated power offset parameter based on the updated power vector; and transmitting the updated power offset parameter.

In certain embodiments, the method comprises encoding the power offset parameter prior to transmitting the power offset parameter.

In various embodiments, the power offset parameter is transmitted in a medium access control message.

In one embodiment, the power offset parameter is transmitted in a radio resource control message.

In some embodiments, the method comprises receiving information indicating whether the power offset parameter comprises the power vector or a maximum transmission power of the power vector.

In one embodiment, an apparatus comprises: a processor that: determines a power vector using at least one sounding reference signal resource, wherein the power vector comprises a power corresponding to each port of a device; and determines a power offset parameter based on the power vector; and a transmitter that transmits the power offset parameter.

In some embodiments, the power offset parameter comprises the power vector.

In certain embodiments: the processor: determines the power vector using the at least one sounding reference signal resource comprises determining a plurality of power vectors, wherein each power vector of the plurality of power vectors is determined using each sounding reference signal resource of a plurality of sounding reference signal resources; and determines the power offset parameter based on the power vector comprises determining a plurality of power offset parameters, wherein each power offset parameter of the plurality of power offset parameters is determined based on a respective power vector of the plurality of power vectors; and the transmitter transmits the power offset parameter comprises transmitting the plurality of power offset parameters.

In various embodiments, the plurality of power offset parameters is concatenated based on an order corresponding to the plurality of sounding reference signal resources.

In one embodiment, the order comprises an ascending order.

In some embodiments, the order comprises a descending order.

In certain embodiments, the power offset parameter comprises a maximum transmission power of the power vector.

In various embodiments, the at least one sounding reference signal resource comprises a plurality of sounding reference signal resources.

In one embodiment, the plurality of sounding reference signal resources is part of a sounding reference signal resource combination.

In some embodiments: the processor: determines the power vector using the at least one sounding reference signal resource comprises determining a plurality of power vectors, wherein each power vector of the plurality of power vectors is determined using a sounding reference signal resource combination of a plurality of sounding reference signal resource combinations; and determines the power offset parameter based on the power vector comprises determining a plurality of power offset parameters, wherein each power offset parameter of the plurality of power offset parameters comprises a maximum transmission power of a corresponding power vector of the plurality of power vectors; and the transmitter transmits the power offset parameter comprises transmitting the plurality of power offset parameters.

In certain embodiments, the plurality of power offset parameters is concatenated based on an order corresponding to a sounding reference signal resource combination bit field.

In various embodiments: the processor: determines the power vector using the at least one sounding reference signal resource comprises determining a plurality of power vectors, wherein each power vector of the plurality of power vectors is determined using a sounding reference signal resource of at least one sounding reference signal port; and determines the power offset parameter based on the power vector comprises determining a plurality of power offset parameters, wherein each power offset parameter of the plurality of power offset parameters comprises a maximum transmission power of a corresponding power vector of the plurality of power vectors; and the transmitter transmits the power offset parameter comprises transmitting the plurality of power offset parameters.

In one embodiment, the apparatus comprises a receiver that receives information indicating a change in transmission power.

In some embodiments, in response to receiving information indicating a change in transmission power: the processor: determines an updated power vector using the at least one sounding reference signal resource; and determines an updated power offset parameter based on the updated power vector; and the transmitter transmits the updated power offset parameter.

In certain embodiments, the processor encodes the power offset parameter prior to transmitting the power offset parameter.

In various embodiments, the power offset parameter is transmitted in a medium access control message.

In one embodiment, the power offset parameter is transmitted in a radio resource control message.

In some embodiments, the apparatus comprises a receiver that receives information indicating whether the power offset parameter comprises the power vector or a maximum transmission power of the power vector.

In one embodiment, a method comprises: receiving a power offset parameter, wherein the power offset parameter is determined based on a power vector, the power vector is determined using at least one sounding reference signal resource, and the power vector comprises a power corresponding to each port of a device.

In some embodiments, the power offset parameter corresponds to each sounding reference signal resource of the at least one sounding reference signal resource.

In certain embodiments, the power offset parameter corresponds to each sounding reference signal resource combination of a plurality of sounding reference signal resource combinations.

In various embodiments, the method comprises determining a power headroom for each antenna port of the device using the power offset parameter and a power headroom report corresponding to the device.

In one embodiment, the method comprises receiving an updated power offset parameter.

In some embodiments, the power offset parameter comprises the power vector.

In certain embodiments, the power offset parameter comprises a maximum transmission power of the power vector.

In various embodiments, the at least one sounding reference signal resource comprises a plurality of sounding reference signal resources.

In one embodiment, the plurality of sounding reference signal resources is part of a sounding reference signal resource combination.

In some embodiments, the method comprises transmitting information indicating a change in transmission power.

In certain embodiments, the power offset parameter is received in a medium access control message.

In various embodiments, the power offset parameter is received in a radio resource control message.

In one embodiment, the method comprises transmitting information indicating whether the power offset parameter comprises the power vector or a maximum transmission power of the power vector.

In one embodiment, an apparatus comprises: a receiver that receives a power offset parameter, wherein the power offset parameter is determined based on a power vector, the power vector is determined using at least one sounding reference signal resource, and the power vector comprises a power corresponding to each port of a device.

In some embodiments, the power offset parameter corresponds to each sounding reference signal resource of the at least one sounding reference signal resource.

In certain embodiments, the power offset parameter corresponds to each sounding reference signal resource combination of a plurality of sounding reference signal resource combinations.

In various embodiments, the apparatus comprises a processor that determines a power headroom for each antenna port of the device using the power offset parameter and a power headroom report corresponding to the device.

In one embodiment, the receiver receives an updated power offset parameter.

In some embodiments, the power offset parameter comprises the power vector.

In certain embodiments, the power offset parameter comprises a maximum transmission power of the power vector.

In various embodiments, the at least one sounding reference signal resource comprises a plurality of sounding reference signal resources.

In one embodiment, the plurality of sounding reference signal resources is part of a sounding reference signal resource combination.

In some embodiments, the apparatus comprises a transmitter that transmits information indicating a change in transmission power.

In certain embodiments, the power offset parameter is received in a medium access control message.

In various embodiments, the power offset parameter is received in a radio resource control message.

In one embodiment, the apparatus comprises a transmitter that transmits information indicating whether the power offset parameter comprises the power vector or a maximum transmission power of the power vector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed at a first device, the method comprising:
   determining a power vector using at least one sounding reference signal resource, wherein the power vector comprises a power corresponding to each port of a device;
   determining a power offset parameter based on the power vector; and
   transmitting the power offset parameter, wherein the power offset parameter identifies power headroom for each antenna port of the first device.

2. The method of claim 1, wherein the power offset parameter comprises the power vector.

3. The method of claim 1, wherein:
   determining the power vector using the at least one sounding reference signal resource comprises determining a plurality of power vectors, wherein each power vector of the plurality of power vectors is determined using each sounding reference signal resource of a plurality of sounding reference signal resources;
   determining the power offset parameter based on the power vector comprises determining a plurality of power offset parameters, wherein each power offset parameter of the plurality of power offset parameters is determined based on a respective power vector of the plurality of power vectors; and
   transmitting the power offset parameter comprises transmitting the plurality of power offset parameters.

4. The method of claim 3, wherein the plurality of power offset parameters is concatenated based on an order corresponding to the plurality of sounding reference signal resources.

5. The method of claim 4, wherein the order comprises an ascending order.

6. The method of claim 4, wherein the order comprises a descending order.

7. The method of claim 1, wherein the power offset parameter comprises a maximum transmission power of the power vector.

8. The method of claim 1, wherein the at least one sounding reference signal resource comprises a plurality of sounding reference signal resources.

9. The method of claim 8, wherein the plurality of sounding reference signal resources is part of a sounding reference signal resource combination.

10. The method of claim 1, wherein:
    determining the power vector using the at least one sounding reference signal resource comprises determining a plurality of power vectors, wherein each power vector of the plurality of power vectors is determined using a sounding reference signal resource combination of a plurality of sounding reference signal resource combinations;
    determining the power offset parameter based on the power vector comprises determining a plurality of power offset parameters, wherein each power offset parameter of the plurality of power offset parameters comprises a maximum transmission power of a corresponding power vector of the plurality of power vectors; and transmitting the power offset parameter comprises transmitting the plurality of power offset parameters.

11. The method of claim 10, wherein the plurality of power offset parameters is concatenated based on an order corresponding to a sounding reference signal resource combination bit field.

12. The method of claim 1, wherein:
determining the power vector using the at least one sounding reference signal resource comprises determining a plurality of power vectors, wherein each power vector of the plurality of power vectors is determined using a sounding reference signal resource of at least one sounding reference signal port;
determining the power offset parameter based on the power vector comprises determining a plurality of power offset parameters, wherein each power offset parameter of the plurality of power offset parameters comprises a maximum transmission power of a corresponding power vector of the plurality of power vectors; and
transmitting the power offset parameter comprises transmitting the plurality of power offset parameters.

13. The method of claim 1, further comprising receiving information indicating a change in transmission power.

14. The method of claim 1, further comprising, in response to receiving information indicating a change in transmission power:
determining an updated power vector using the at least one sounding reference signal resource;
determining an updated power offset parameter based on the updated power vector; and
transmitting the updated power offset parameter.

15. The method of claim 1, further comprising encoding the power offset parameter prior to transmitting the power offset parameter.

16. The method of claim 1, wherein the power offset parameter is transmitted in a medium access control message.

17. The method of claim 1, wherein the power offset parameter is transmitted in a radio resource control message.

18. The method of claim 1, further comprising receiving information indicating whether the power offset parameter comprises the power vector or a maximum transmission power of the power vector.

19. An apparatus comprising:
a plurality of antenna ports;
a processor that:
determines a power vector using at least one sounding reference signal resource, wherein the power vector comprises a power corresponding to each of the antenna ports; and
determines a power offset parameter based on the power vector; and
a transmitter that transmits the power offset parameter, wherein the power offset parameter identifies power headroom for each of the antenna ports.

20. A method performed at a first device, the method comprising:
receiving a power offset parameter, wherein the power offset parameter is determined based on a power vector, the power vector is determined using at least one sounding reference signal resource, and the power vector comprises a power corresponding to each port of a device; and
determining power headroom for each antenna port of a second device having sent the power offset parameter, wherein the determining is based on the received power offset parameter.

* * * * *